United States Patent
Jung et al.

(10) Patent No.: US 11,123,707 B2
(45) Date of Patent: Sep. 21, 2021

(54) COMPOSITES FOR REMOVING HEAVY METAL AND METHOD OF SYNTHESIZING THE SAME

(71) Applicants: Research & Business Foundation Sungkyunkwan University, Suwon-si (KR); GLOBAL FRONTIER CENTER FOR MULTISCALE ENERGY SYSTEMS, Seoul (KR)

(72) Inventors: Hyun Suk Jung, Seoul (KR); Yeon Kyeong Ju, Suncheon-si (KR); Mi Yeon Baek, Seoul (KR); Sang Myeong Lee, Gimhae-si (KR); Yun Seok Kim, Seoul (KR); Byeong Jo Kim, Seoul (KR); Min Hee Kim, Suwon-si (KR); So Yeon Park, Cheongju-si (KR)

(73) Assignees: Research & Business Foundation Sungkyunkwan University, Suwon-si (KR); GLOBAL FRONTIER CENTER FOR MULTISCALE ENERGY SYSTEMS, Seoul (KR)

( * ) Notice: Subject to any disclaimer, the term of this patent is extended or adjusted under 35 U.S.C. 154(b) by 884 days.

(21) Appl. No.: 15/889,611

(22) Filed: Feb. 6, 2018

(65) Prior Publication Data
US 2018/0236435 A1    Aug. 23, 2018

(30) Foreign Application Priority Data

Feb. 23, 2017    (KR) ........................ 10-2017-0024008

(51) Int. Cl.
*C01B 25/32*    (2006.01)
*C04B 35/447*    (2006.01)
(Continued)

(52) U.S. Cl.
CPC ............. *B01J 20/06* (2013.01); *B01J 20/048* (2013.01); *B01J 20/28009* (2013.01); *B01J 20/28021* (2013.01); *B01J 20/3085* (2013.01); *B01J 20/3204* (2013.01); *B01J 20/3225* (2013.01); *B01J 20/3236* (2013.01);
(Continued)

(58) Field of Classification Search
CPC ...... C04B 2235/664; C04B 2235/3272; C04B 2235/447; C04B 35/447; H01F 1/061; H01F 1/36; C01B 25/32
See application file for complete search history.

(56) References Cited

FOREIGN PATENT DOCUMENTS

KR    10-2011-0105651 A    9/2011
KR    20140124028 A    10/2014

OTHER PUBLICATIONS

Lin et al., "Hollow magnetic hydroxyapatite microspheres with hierarchically mesoporous microstructure for pH responsive drug delivery",CrystEngComm 2013 15, pp. 2999-3008. (Year: 2013).*

(Continued)

*Primary Examiner* — Matthew E. Hoban
*Assistant Examiner* — Lynne Edmondson
(74) *Attorney, Agent, or Firm* — NSIP Law

(57) ABSTRACT

The present disclosure relates to a method of synthesizing composites for removing heavy metals, including: preparing hollow hydroxyapatite particles including a functional group; preparing a composite in which magnetic oxide nanoparticles are combined on the hollow hydroxyapatite; and preparing a composite of hollow hydroxyapatite and metal particles by performing reduction annealing to the composite.

8 Claims, 12 Drawing Sheets

HAP/IONPs PARTICLE

HAP/Fe PARTICLE

Reduction annealing
500 °C/2h
under $H_2/O_2$ gas

(51) Int. Cl.
*H01F 1/36* (2006.01)
*B01J 20/06* (2006.01)
*B01J 20/04* (2006.01)
*B01J 20/28* (2006.01)
*B01J 20/32* (2006.01)
*B09C 1/08* (2006.01)
*B01J 20/30* (2006.01)
*C02F 1/28* (2006.01)
*C02F 101/20* (2006.01)

(52) U.S. Cl.
CPC ............ *B01J 20/3293* (2013.01); *B09C 1/08* (2013.01); *C02F 1/288* (2013.01); *C02F 1/281* (2013.01); *C02F 2101/20* (2013.01); *C02F 2101/203* (2013.01); *Y02W 10/37* (2015.05)

(56) References Cited

OTHER PUBLICATIONS

Hardani et al., "Removal of Toxic Mercury(II) from Water via Fe3O4/Hydroxyapatite Nanoadsorbent: An Efficient Economic and Rapid Approach", Mar. 30, 2015, AASCIT Journal of Nanoscience, pp. 11-16. (Year: 2015).*

KH. Hardani et al., Removal of Toxic Mercury (II) from Water via Fe3O4/Hydroxyapatite Nanoadsorbent: An Efficient Economic and Rapid Approach, AASCIT Journal of Nanoscience, Mar. 2015; 1(1): 11-18.

* cited by examiner

COMPOSITES FOR REMOVING HEAVY METAL AND METHOD OF SYNTHESIZING THE SAME

CROSS-REFERENCE TO RELATED APPLICATION

This application claims the benefit of Korean Patent Application No. 2017-0024008 filed on Feb. 23, 2017, the disclosures of which are incorporated herein by reference.

TECHNICAL FIELD

The present disclosure relates to composites for removing heavy metals and a method of synthesizing the same.

BACKGROUND

With recently growing interest in the environment, heavy-metal contamination of soil or water caused by waste water or slug discharged from various factories and construction sites and various plans for dealing with the contamination are being researched. Heavy metals accumulated in soil, water, or air come with serious to humans and ecosystem, and, thus, multipronged efforts to find a heavy metal removal method for efficiently removing or reducing the heavy metals are being made.

As methods for treating soil contaminated with heavy metals, solidification, a biological treatment method involved in purification using plants, an annealing method of directly incinerating contaminated soil to be oxidized or converted into another salt, a chemical treatment method based on soil washing, and an electrokinetic method which is an electrochemical treatment method have been used.

The solidification for preventing environmental contamination is performed to detoxify heavy metals contained in hazardous waste or transmute the heavy metals into a form difficult to be eluted in order for the heavy metals not to contaminate groundwater or soil through a medium in the environment. As part of the solidification, hazardous waste has been improved in handling to prevent discharge of arsenic acid or leakage of leachate during transport or disposal of the hazardous waste. However, the above-described solidification cannot be a fundamental solution to heavy-metal contamination.

The biological treatment method takes a long time for treatment and generates a large amount of slurry which is in need of aftertreatment and has low efficiency. Further, the annealing method has high efficiency but has low economic feasibility and makes soil insoluble.

Further, the soil washing method in which contaminants in soil are transferred and separated in a liquid state by using a washing solution and mechanical friction to greatly reduce the amount of contamination in soil has excellent efficiency but makes soil insoluble and has a risk of secondary contamination. Furthermore, the electrokinetic method has a disadvantage caused by the use of acids and cannot be used in low-penetrability soil.

As alternative solutions to these problems, a method of coating polyacrylic acid which is a polymer on a polymer magnetic material to extract heavy metals or a material obtained by physically combining a chelating agent with activated carbon have been researched. However, polyacrylic acid used in the above-described method has adhesion high enough to be used as an adhesive. Therefore, in the case where the polyacrylic acid is applied to a material having pores, such as zeolite or the like, the polyacrylic acid reduces heavy metal extraction efficiency. If the amount of input of the polyacrylic acid is reduced to solve this problem, functional groups are reduced, and, thus, the heavy metal extraction efficiency is reduced. Further, in the case where the material prepared by physically impregnating a chelating agent in activated carbon is used to extract heavy metals at a high temperature, there is a risk that the chelating agent in the activated carbon may be eluted out of an aqueous solution.

Meanwhile, perovskite is an oxide having superconductivity as well as properties of a nonconductor, a semiconductor, and a conductor, and a solar cell using this material as a light absorbing layer in a solar collector has high efficiency as compared with the existing silicon-based solar cells and thus has been drawing a lot of attention as a next-generation solar cell. However, perovskite uses lead, which is a heavy metal, as a core material, and the lead may remain during a process of manufacturing a solar cell and it is difficult to treat the remaining lead.

Therefore, a material and method for removing heavy metals with high physical and chemical stability as well as excellent heavy metal adsorption efficiency is still demanded to solve the above-described problems.

Korean Patent No. 1459739 discloses a polymer complex having a heavy metal-selective absorbability and superhydrophobicity. However, this patent document does not include any description about the heavy metal removal efficiency in a perovskite waste solvent.

SUMMARY OF THE INVENTION

In view of the foregoing, the present disclosure provides a method of synthesizing composites for removing heavy metals.

Further, the present disclosure provides composites for removing heavy metals.

However, problems to be solved by the present disclosure are not limited to the above-described problems. There may be other problems to be solved by the present disclosure.

According to a first aspect of the present disclosure, there is provided a method of synthesizing composites for removing heavy metals, including: preparing hollow hydroxyapatite (HAP) particles including a functional group; preparing a composite in which magnetic oxide nanoparticles are combined on the hollow HAP; and preparing a composite of hollow HAP and metal particles by performing reduction annealing to the composite.

According to an exemplary embodiment of the present disclosure, the hollow HAP particles may be formed by ion exchange based on a Kirkendall effect, but may not be limited thereto.

According to an exemplary embodiment of the present disclosure, the magnetic oxide nanoparticles may be combined with the functional group of the hollow HAP by a hydrogen bond, but may not be limited thereto.

According to an exemplary embodiment of the present disclosure, the magnetic oxide nanoparticles may be combined with the functional group of the hollow HAP by an amide bond between a carboxyl group formed on the magnetic nanoparticle and an amine group formed on the hollow HAP, but may not be limited thereto.

According to an exemplary embodiment of the present disclosure, the amine group may be formed by adding the hollow HAP particles and (3-aminopropyl)trimethoxysilane into C1 to C4 lower alcohol and making a reaction, but may not be limited thereto.

According to an exemplary embodiment of the present disclosure, the carboxyl group may be formed by dispersing magnetic nanoparticles in a non-polar solvent, mixing them with a polar aprotic solvent including an organic carboxylic acid and making a reaction, but may not be limited thereto.

According to an exemplary embodiment of the present disclosure, the magnetic oxide nanoparticles may include an oxide of a metal selected from the group consisting of iron, cobalt, nickel, and combinations thereof, but may not be limited thereto.

According to an exemplary embodiment of the present disclosure, the annealing to the composite may be performed under a reducing atmosphere, but may not be limited thereto.

According to an exemplary embodiment of the present disclosure, the annealing to the composite may be performed under an atmosphere of $H_2/N_2$ mixture gas, but may not be limited thereto.

According to a second aspect of the present disclosure, there are provided composites for removing heavy metals, including hollow HAP and magnetic particles combined on the hollow HAP.

According to an exemplary embodiment of the present disclosure, the magnetic particles may include particles of a metal selected from the group consisting of iron, cobalt, nickel, and combinations thereof, but may not be limited thereto.

The above-described exemplary embodiments are provided by way of illustration only and should not be construed as liming the present disclosure. Besides the above-described exemplary embodiments, there may be additional exemplary embodiments described in the accompanying drawings and the detailed description.

According to the above-described aspects of the present disclosure, a composite for removing heavy metals prepared by a synthesis method according to the present disclosure has a large surface area and can adsorb heavy metals not only from HAP but also from iron particles and thus exhibits improved heavy metal adsorption efficiency.

Further, iron nanoparticles are highly magnetic, and, thus, after heavy metals are adsorbed, it is easier to remove heavy metal adsorbing particles using a magnet. Therefore, the composite for removing heavy metals according to the present disclosure can be usefully used in a process for removing lead and particularly in a process for treating heavy metals present in waste generated after manufacturing of a perovskite solar cell.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION OF THE INVENTION

Figure 1:
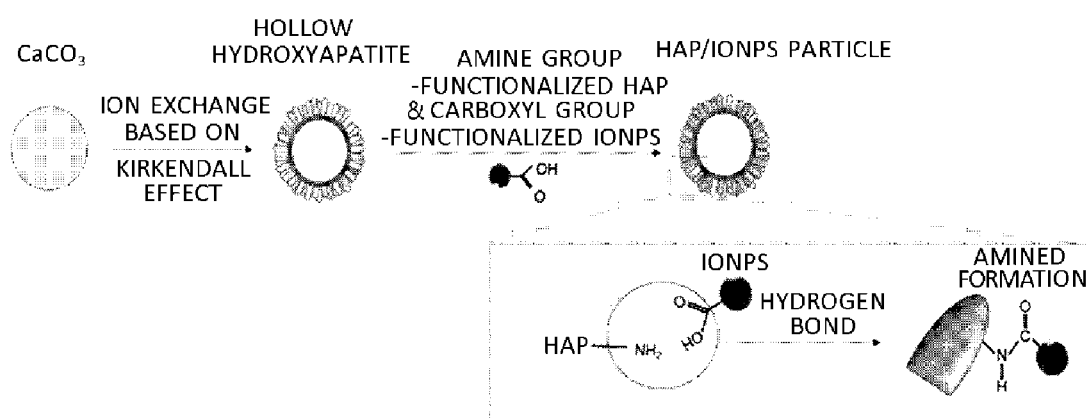
FIG. 1 is a schematic diagram illustrating a method of synthesizing a composite of hollow HAP and an iron oxide according to an exemplary embodiment of the present disclosure.

Hereinafter, embodiments of the present disclosure will be described in detail with reference to the accompanying drawings so that the present disclosure may be readily implemented by those skilled in the art.

However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the terms "on", "above", "on an upper end", "below", "under", and "on a lower end" that are used to designate a position of one element with respect to another element include both a case that the one element is adjacent to the other element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

Through the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, a phrase in the form "A and/or B" means "A or B, or A and B".

Hereinafter, composites for removing heavy metals and a method of synthesizing composites for removing heavy metals of the present disclosure will be described in detail with reference to embodiments and examples and the accompanying drawings. However, the present disclosure may not be limited to the following embodiments, examples and drawings.

According to a first aspect of the present disclosure, there is provided a method of synthesizing composites for removing heavy metals, including: preparing hollow hydroxyapatite(HAP) particles including a functional group; preparing a composite in which magnetic oxide nanoparticles are combined on the hollow HAP; and preparing a composite of hollow HAP and metal particles performing reduction annealing to the composite.

According to an exemplary embodiment of the present disclosure, the hollow HAP particles may be formed by ion exchange based on a Kirkendall effect.

The Kirkendall effect refers to an interface change occurring when smooth surfaces of two kinds of solids are brought into close contact with each other and heated at a high temperature to diffuse atoms. This effect is generated when atoms are diffused through vacancy or interstitial atoms, but is not generated when atoms are diffused by direct exchange of atoms. In general, a marker may be shifted or pores appear on one side due to a difference in diffusion rate between dissimilar metals having different diffusion rates.

According to an exemplary embodiment of the present disclosure, the preparing of hollow HAP particles may include: adding a second solution in which a carbonate ion source is mixed in deionized water to a first solution in which polystyrene sulfonate and a calcium source are mixed, mixing the first solution with the second solution, and performing centrifugation; adding a phosphate aqueous solution to a resultant product obtained by the centrifugation and adjusting a pH with an alkaline solution; and performing a hydrothermal synthesis reaction to the solution with an adjusted pH.

According to an exemplary embodiment of the present disclosure, the calcium source may be selected from the group consisting of calcium nitrate ($Ca(NO_3)_2$), calcium oxide (CaO), calcium hydroxide ($Ca(OH)_2$), calcium chloride ($CaCl_2$), calcium acetate ($Ca(CH_3COO)_2$), and combinations thereof, and may employ preferably calcium nitrate ($Ca(NO_3)_2$), but may not be limited thereto.

According to an exemplary embodiment of the present disclosure, the carbonate ion source may be selected from the group consisting of sodium carbonate ($Na_2CO_3$), sodium bicarbonate ($NaHCO_3$), magnesium carbonate ($MgCO_3$), and combinations thereof, and may employ preferably sodium carbonate ($Na_2CO_3$), but may not be limited thereto.

According to an exemplary embodiment of the present disclosure, the phosphate aqueous solution may be selected from the group consisting of a disodium hydrogen phosphate ($Na_2HPO_4$) aqueous solution, a sodium dihydrogen phosphate ($NaH_2PO_4$) aqueous solution, an ammonium dihydrophosphate (($NH_4$)$H_2PO_4$) aqueous solution, and combinations thereof, and may be preferably disodium hydrogen phosphate ($Na_2HPO_4$), but may not be limited thereto.

According to an exemplary embodiment of the present disclosure, the alkaline solution may be selected from the group consisting of an ammonia ($NH_3$) aqueous solution, a sodium hydroxide (NaOH) aqueous solution, a sodium carbonate ($Na_2CO_3$) aqueous solution, a sodium bicarbonate ($NaHCO_3$) aqueous solution, a potassium hydroxide (KOH) aqueous solution, and combinations thereof, and may be preferably an ammonia ($NH_3$) aqueous solution, but may not be limited thereto.

According to an exemplary embodiment of the present disclosure, the pH may be adjusted in the range of from pH 7 to pH 13 and may be adjusted to preferably pH 11, but may not be limited thereto.

According to an exemplary embodiment of the present disclosure, the magnetic oxide nanoparticles may be combined with the functional group of the hollow HAP by a hydrogen bond, but may not be limited thereto.

According to an exemplary embodiment of the present disclosure, more specifically, the magnetic oxide nanoparticles may be combined with the functional group of the hollow HAP by an amide bond between a carboxyl group formed on the magnetic nanoparticle and an amine group formed on the hollow HAP.

The amide bond refers to a linkage formed by removing water from an amine group and a carboxyl group and has the chemical formula —CONH—. The amide bond is generated by a reaction between an acid chloride or an acid anhydride and ammonia, primary or secondary amine and hydrolyzed by acid or alkali action. The amide bond has double bond properties due to the contribution of zwitterionic structure and has a relatively high rotation barrier (about 100 kJ per 1 mol) in its molecule. N-alkylamide may exist in two forms, s-trans (Z) and s-cis (E), and typically, the Z form is more stable.

According to an exemplary embodiment of the present disclosure, the amine group may be formed by adding the hollow HAP particles and (3-aminopropyl)trimethoxysilane into C1 to C4 lower alcohol and making a reaction, but may not be limited thereto.

According to an exemplary embodiment of the present disclosure, the C1 to C4 lower alcohol may be selected from the group consisting of ethanol, methanol, propanol, butanol, and combinations thereof, and may be preferably ethanol, but may not be limited thereto.

According to an exemplary embodiment of the present disclosure, the carboxyl group may be formed by dispersing magnetic nanoparticles in a non-polar solvent, mixing them with a polar aprotic solvent including an organic carboxylic acid and making a reaction.

According to an exemplary embodiment of the present disclosure, the non-polar solvent may be selected from the group consisting of hexane, butane, pentane, isopentane, heptane, octane, isooctane, cyclopentane, methylcyclopentane, cyclohexane, methylcyclohexanem, ethylcyclohexane, benzene, toluene, ethylbenzene, xylene, and combinations thereof, and may employ preferably hexane, but may not be limited thereto.

According to an exemplary embodiment of the present disclosure, the organic carboxylic acid may be selected from the group consisting of citric acid, adipic acid, glutaric acid, malonic acid, succinic acid, phthalic acid, maleic acid, citraconic acid, itaconic acid, anhydrides of the acids, and combinations thereof, and may employ preferably citric acid.

A lot of citric acid is contained in the citrus fruit family including citron. When the citric acid is crystallized in water, a large bar-shaped crystal containing 1 mole of water of crystallization is produced. When the crystal is heated, it turns into an anhydride, and its melting point is 153° C. When the temperature is increased, it turns into aconitinic acid at 175° C. At a high temperature, an itaconic anhydride, a citraconic anhydride as a transposition product, and acetone carboxylic acid are produced.

According to an exemplary embodiment of the present disclosure, the polar aprotic solvent may be one selected from the group consisting of dimethyl sulfoxide (DMSO), 1,2-dichloroethane (DCE), dichloromethane (DCM), chloroform ($CHCl_3$), toluene (PhMe), N,N-dimethylformamide (DMF), N,N-dimethylacetamide (DMAC), N-methyl-2-pyrrolidone (NMP), ethyl acetate (EtOAc), acetonitrile (MeCN), n-heptane, 1,4-dioxane, acetone, methyl isobutylketone (MIBK), tetrahydrofuran (THF), and combinations thereof, and may employ preferably dimethyl sulfoxide (DMSO), but may not be limited thereto.

According to an exemplary embodiment of the present disclosure, the magnetic oxide nanoparticles may include an oxide of a metal selected from the group consisting of iron, cobalt, nickel, and combinations thereof, and may be preferably iron, but may not be limited thereto.

According to an exemplary embodiment of the present disclosure, the annealing may be performed to form metal particles by reducing the magnetic oxide nanoparticles and may be performed under a reducing atmosphere to improve the efficiency of the reduction.

According to an exemplary embodiment of the present disclosure, the annealing to the composite may be performed under an atmosphere of $H_2/N_2$ mixture gas.

According to a second aspect of the present disclosure, there are provided composites for removing heavy metals, including hollow HAP and magnetic particles combined on the hollow HAP.

According to an exemplary embodiment of the present disclosure, the magnetic nanoparticles may include particles of a metal selected from the group consisting of iron, cobalt, nickel, and combinations thereof, and may be preferably iron, but may not be limited thereto.

Detailed descriptions of parts of the composites for removing heavy metals according to the second aspect of the present disclosure, which overlap with those of the first aspect of the present disclosure, are omitted hereinafter, but the descriptions of the first aspect of the present disclosure may be identically applied to the second aspect of the present disclosure, even though they are omitted hereinafter.

Hereinafter, the present disclosure will be described in more detail with reference to examples. The following examples are provided only for explanation, but do not intend to limit the scope of the present disclosure.

Example 1

Synthesis of Hollow Hydroxyapatite Particles

A composite of hydroxyapatite and iron of the present disclosure was synthesized by a method as shown in FIG. 1. Specifically, spherical calcium carbonate ($CaCO_3$) particles were prepared first and hollow hydroxyapatite (HAP) particles were prepared using a Kirkendall effect. The spherical calcium carbonate particles were prepared using a fast precipitation method.

A first solution was prepared by mixing 0.472 g of calcium nitrate ($Ca(NO_3)_2$) in 20 ml of a 25 g/L polystyrene sulfonate (PSS) solution, and a second solution was prepared by dissolving 0.212 g of sodium carbonate ($Na_2CO_3$) in 5 ml of deionized water.

Each solution was completely dissolved and then, the second solution was added into the first solution and then briskly mixed for 30 minutes, followed by centrifugation to obtain a resultant product.

30 ml of a 0.5 M disodium hydrogen phosphate ($Na_2HPO_4$) aqueous solution was mixed with the obtained product and a pH thereof was adjusted to pH 11 using an ammonia solution.

Figure 2:
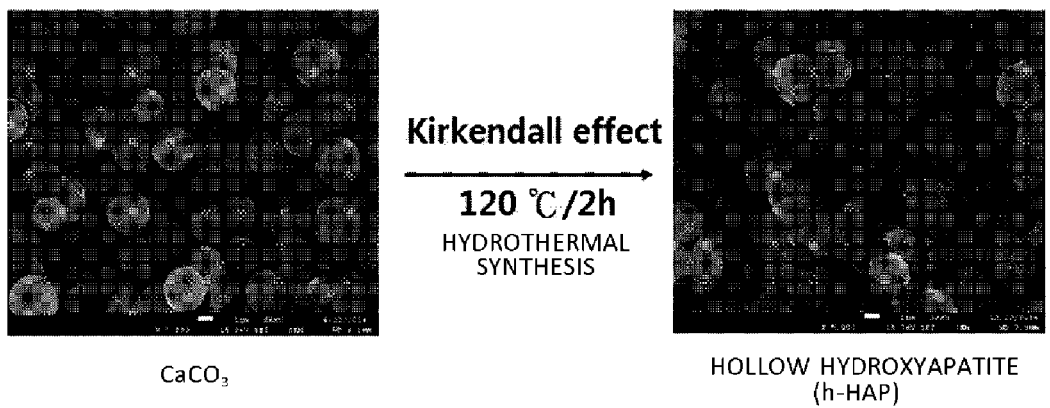
FIG. 2 shows calcium carbonate ($CaCO_3$) particles and hollow HAP particles according to an example of the present disclosure as observed under a scanning electron microscope (SEM).

The solution was transferred to a container for hydrothermal synthesis and then reacted in an oven for 2 hours at 120° C. After the reaction, a resultant product was washed with deionized water and ethanol and dried in a vacuum oven for 3 hours at 60° C. Finally, as shown in FIG. 2, hollow HAP particles were obtained using the spherical $CaCO_3$ particles as a template by ion exchange based on a Kirkendall effect.

Example 2

Synthesis of Composite of Hollow Hydroxyapatite and Iron Oxide Nanoparticle

A composite of hydroxyapatite and iron oxide nanoparticles (HAP/IONPs) was synthesized through a surface treatment to each of hollow HAP and iron oxide nanoparticles.

Specifically, in order to form an amine group on surfaces of the HAP particles synthesized in Example 1, 0.1 g of the HAP particles and 2 ml of (3-aminopropyl)trimethoxysilane were put into 10 ml of ethanol and mixed therein and then mixed in a 70° C. oil reactor for 3 hours. After the reaction, a resultant product was washed with ethanol and dried in a vacuum oven.

In order to form a carboxyl group on surfaces of iron oxide nanoparticles (IONPs), 5 ml of IONPs dispersed in hexane at a concentration of 1 mg/ml was put into 5 ml of DMSO in which citric acid was dispersed at a concentration of 10 mg/ml and then briskly mixed and reacted in a 70° C. oil reactor for 3 hours. After the reaction, oleic acid and citric acid which remained after drying hexane was washed with ethanol and removed from an 80° C. hot plate. Then, the IONPs on which the carboxyl group was formed were kept as dispersed in ethanol at a concentration of 1 mg/ml. In order to form a composite of HAP and IONPs, the HAP on which the amine group was formed and the IONPs on which the carboxyl group was formed were mixed at a mass ratio of 10:1. The HAP and the IONPs were combined with each other by a hydrogen bond between the amine group and the carboxyl group.

Example 3

Synthesis of Composite of Hydroxyapatite and Iron (HAP/Fe)

Figure 3:
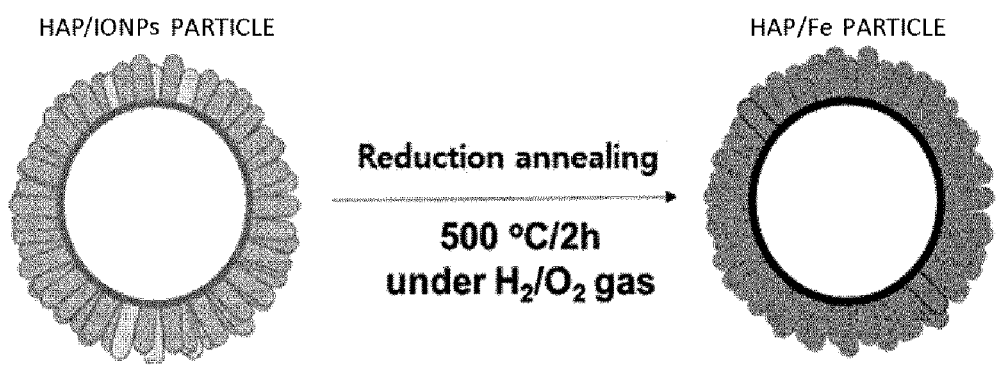
FIG. 3 is a schematic diagram illustrating a method of synthesizing a composite of HAP and iron nanoparticles by performing reduction annealing to a composite of HAP and iron oxide nanoparticles according to an exemplary embodiment of the present disclosure.

As shown in FIG. 3, annealing was carried out in an alumina tube furnace using the following conditions to form a composite of HAP and Fe by reducing the HAP and the iron oxide nanoparticles. Reduction annealing was performed to the dried composite of HAP and IONPs synthesized in Example 2 at 500° C. for 2 hours under an atmosphere of a $H_2/N_2$ mixture gas.

Test Example 1

Check of Microstructure of Each Particle

The microstructures of the HAP particles, the IONPs particles and the HAP/IONPs composite synthesized in Examples as described above were observed by XRD.

Figure 4:
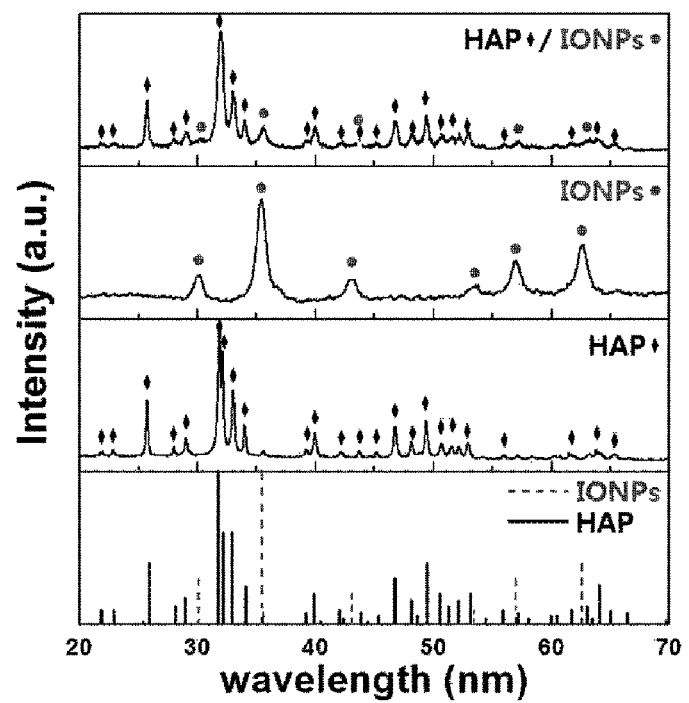
FIG. 4 shows a composite of HAP and iron oxide nanoparticles and HAP particles or iron oxide nanoparticles according to an example of the present disclosure as observed by X-ray diffractometry (XRD).

Referring to FIG. 4, it can be seen that before the HAP/IONPs composite was formed, each had a structure of HAP and iron oxide (magnetite), and both HAP and iron oxide (magnetite) could be observed in the HAP/IONPs composite.

Test Example 2

Check of Properties of HAP/IONPs Composite

The properties of the HAP/IONPs composite synthesized in Example 2 were checked using a SEM, an EDX, and a TEM.

Figure 5:
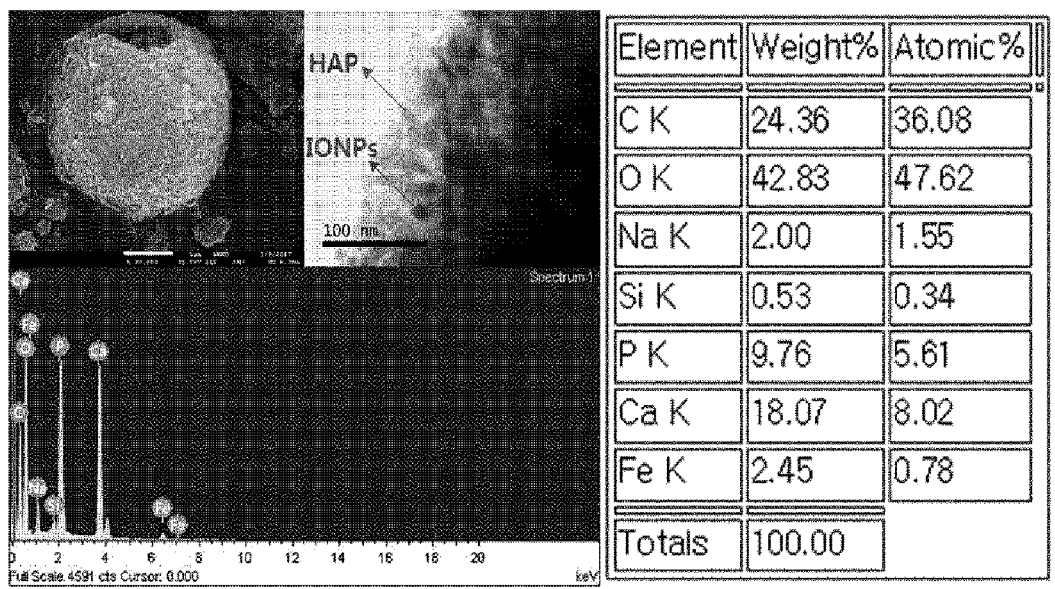
FIG. 5 shows a composite of HAP and iron oxide nanoparticles according to an example of the present disclosure as observed under a SEM, an energy dispersive X-ray spectroscope (EDX), or a transmission electron microscope (TEM).

As a result thereof, it can be seen from the SEM result that the synthesized particle had a hollow shape and it can also be seen from the TEM image of a particle surface that IONPs were combined on surfaces of HAP as shown in FIG. 5. Also, it can be seen from the EDX result that the synthesized particles contained iron.

Test Example 3

Check of Properties of HAP/Fe Composite

The properties of the HAP/Fe composite synthesized in Example as described above were checked using a SEM, an EDX, and a TEM.

Figure 6:
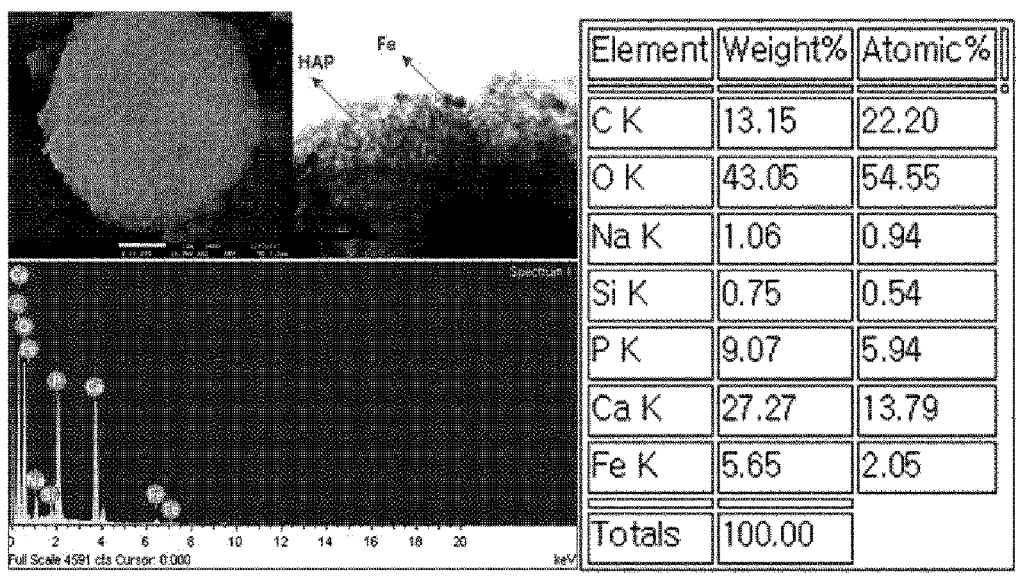
FIG. 6 shows a composite of HAP and iron according to an example of the present disclosure as observed under a SEM, an EDX, or a TEM.

As a result thereof, it can be seen from the SEM result that the synthesized particle had a hollow shape and it can also be seen from the TEM image of a particle surface that Fe particles were formed on surfaces of HAP as shown in FIG. 6. Also, it can be seen from the EDX result that the synthesized particles contained iron.

Test Example 4

Check of Microstructure of HAP/Fe Composite

The microstructure of the HAP/Fe composite synthesized in Example as described above was observed by XRD.

Figure 7:
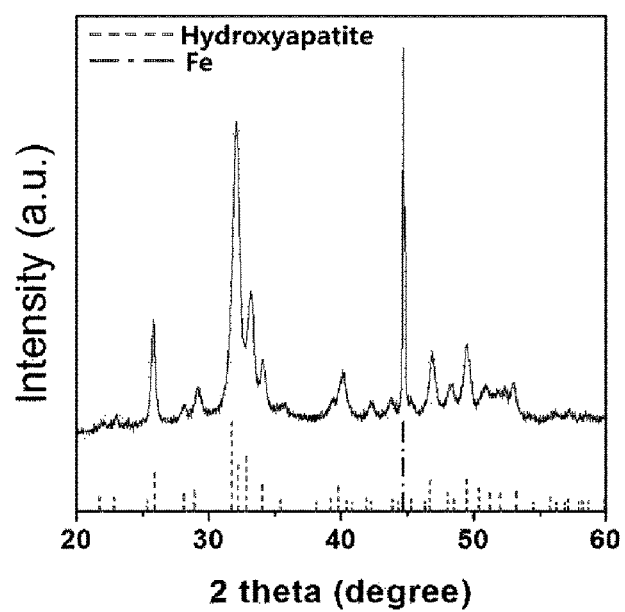
FIG. 7 shows a composite of HAP and iron according to an example of the present disclosure as observed by XRD.

As a result thereof, the XRD result of the HAP/Fe composite shows that JCPDS card 09-0432 for HAP and JCPDS card 06-0696 for Fe were matched with each other as shown in FIG. 7. Therefore, it was confirmed that the synthesized particles were the HAP/Fe composite.

Test Example 5

Comparison in Surface Properties of Each Particle

The surface properties of the HAP particles, the HAP/IONPs particles and the HAP/Fe particles synthesized in Examples as described above were checked using N2 adsorption-desorption spectra.

Figure 8:
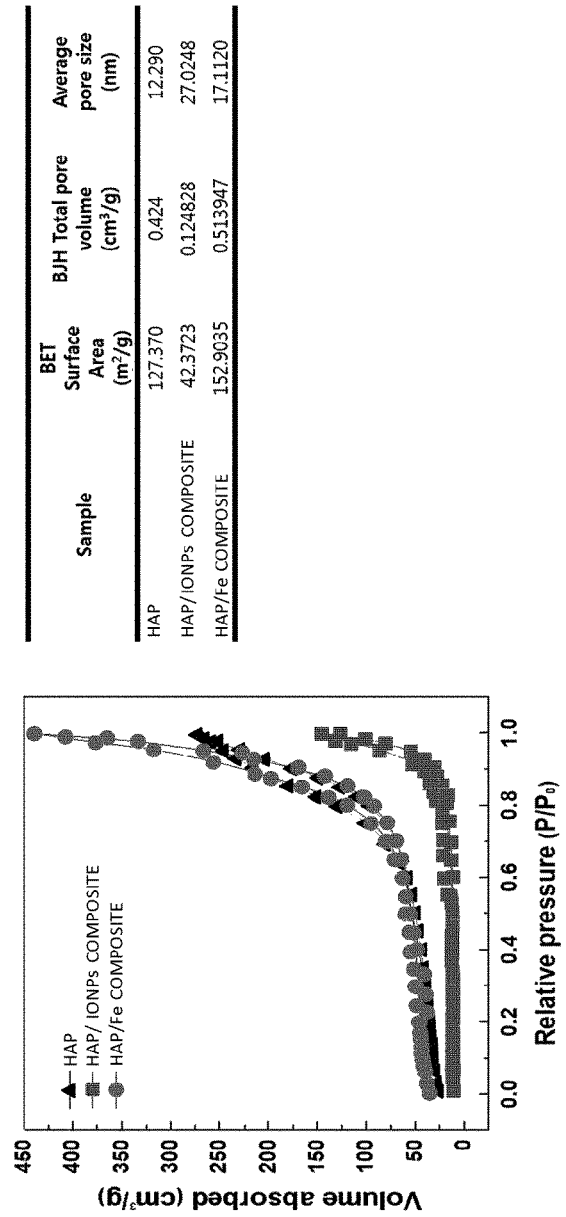
FIG. 8 shows the result of comparison in surface properties among HAP, a composite of HAP and iron oxide nanoparticles, or a composite of HAP and iron according to an example of the present disclosure.

As a result thereof, referring to FIG. 8, the HAP/Fe composite had the highest BET Surface Area ($m^2$/g) and BJH Total pore volume of about 152.9 and 0.514, respectively. Therefore, it was confirmed that the HAP/Fe particles had the highest heavy metal adsorption ability efficiency.

Test Example 6

Check of Magnetic Properties of HAP/IONPs Particle and HAP/Fe Particle

The magnetic properties of the HAP/IONPs particles synthesized in Example 2 and the HAP/Fe particles synthesized in Example 3 were checked and compared.

Figure 9:
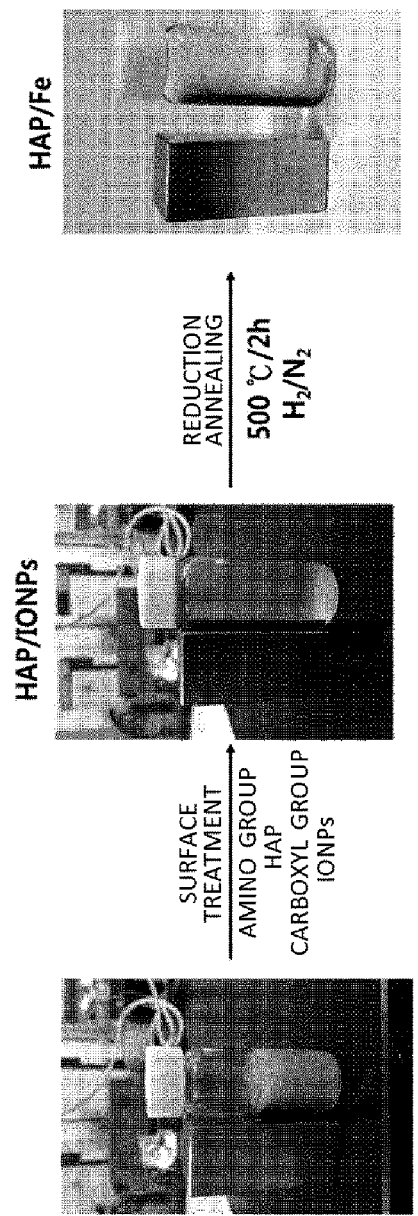
FIG. 9 shows the result of observation of magnetic properties of HAP, a composite of HAP and iron oxide nanoparticles or a composite of HAP and iron according to an example of the present disclosure.

As a result thereof, it was confirmed that the HAP/IONPs particles and the HAP/Fe particles were magnetic and the particles were separated from an aqueous solution due to their magnetism as shown in FIG. 9.

Test Example 7

Check of Heavy Metal Adsorption Efficiency

The heavy metal adsorption properties of the HAP particles, the HAP/IONPs particles and the HAP/Fe particles synthesized in Examples as described above were checked. Firstly, a solution containing heavy metals in which lead iodide ($PbI_2$) was dissolved in a N,N-dimethylformamide (DMF) solvent at a concentration of 1 mM was prepared. The HAP particles, the HAP/IONPs particles or the HAP/Fe particles were put into the prepared solution to a concentration of 10 mg/ml and stirred for 3 hours. The HAP particles were separated using a centrifuge, and the HAP/IONPs and HAP/Fe particles were separated from the solvent using a magnet. After the removal of heavy metal ions, the amount of ions remaining in the solvent was checked using an Inductively Coupled Plasma-Mass Spectrometer (ICP-MS) and a 4-(2-pyridylazo)-resorcinol (PAR) pigment.

Figure 10:
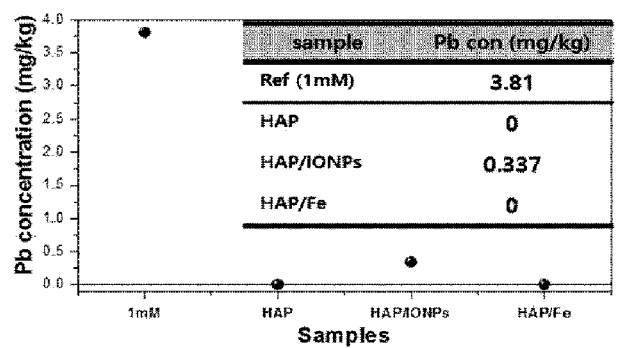
FIG. 10 shows the result of observation of heavy metal ion removal of HAP, a composite of HAP and iron oxide nanoparticles or a composite of HAP and iron from a waste solution according to an example of the present disclosure.
Figure 10:
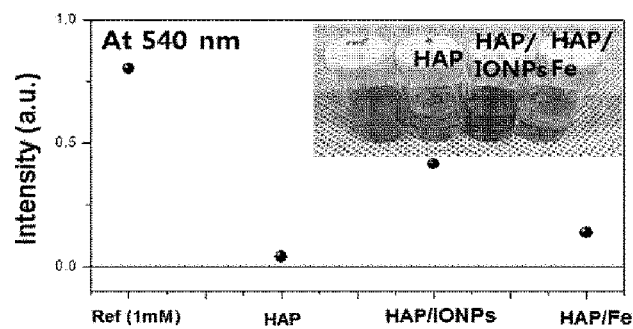

As a result thereof, according to the concentration of lead remaining in the solution after the removal of heavy metal ions, the HAP particles or the HAP/Fe particles adsorbed all the lead in the solution as shown in FIG. 10. However, it can be seen that the HAP/IONPs particles did not completely adsorb lead, and, thus, lead remained at a concentration of 0.337 mg/ml in the solution and lead ions reacted with the PAR pigment. That is, since the composite having magnetism was synthesized by combining iron oxide (IONPs) on surfaces of the HAP particles, it became easier to remove the particles in the solution, but the lead adsorption removal efficiency was reduced due to a decrease in surface area of the composite. However, the HAP/Fe particles in which IONPs were reduced with iron (Fe) particles and impurities were removed from the surfaces were excellent in magnetism and lead adsorption removal efficiency.

Test Example 8

Check of Lead Adsorption Efficiency After Removal of Heavy Metal Ion

After heavy metal ions were removed using the HAP particles, the HAP/IONPs particles and the HAP/Fe particles synthesized in Examples as described above, the lead adsorption efficiency was checked.

Figure 11:
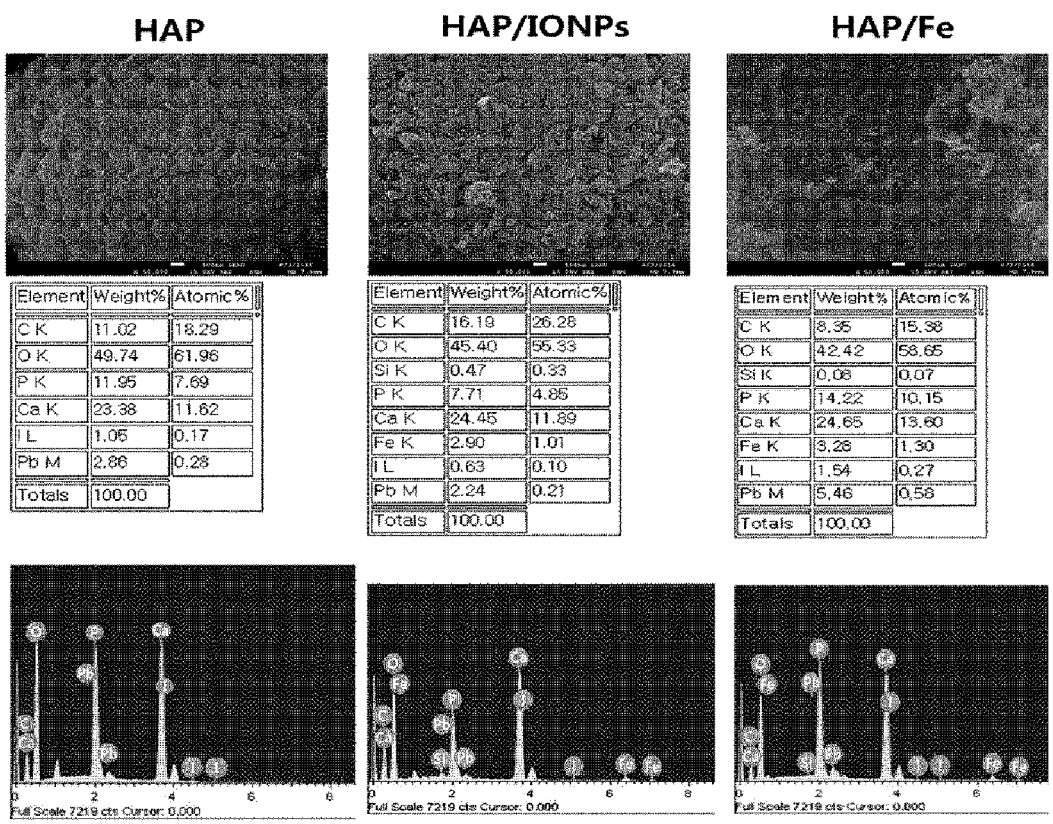
FIG. 11 shows the result of observation of whether or not HAP, a composite of HAP and iron oxide nanoparticles or a composite of HAP and iron adsorbs lead after removal of heavy metal ions according to an example of the present disclosure.

As a result, according to the EDX results measured on the HAP particles, the HAP/IONPs particles and the HAP/Fe particles after the heavy metal adsorption reaction, it was confirmed that lead was detected from all the particles as shown in FIG. 11.

Test Example 9

Check of Lead Ion Removal Characteristics of HAP/Fe Particle

Whether or not the HAP/Fe particles synthesized in Example as described above can be applied to removal of heavy metals from a perovskite waste solution was checked.

To this end, a perovskite solar cell suggested in a disclosed document (Nature Communications Vol. 7 2041-1723, 2016) was immersed in a DMF solvent to remove a light absorbing layer containing lead ions. Then, lead ions were removed from a waste solution using the HAP/Fe composite.

Figure 12:
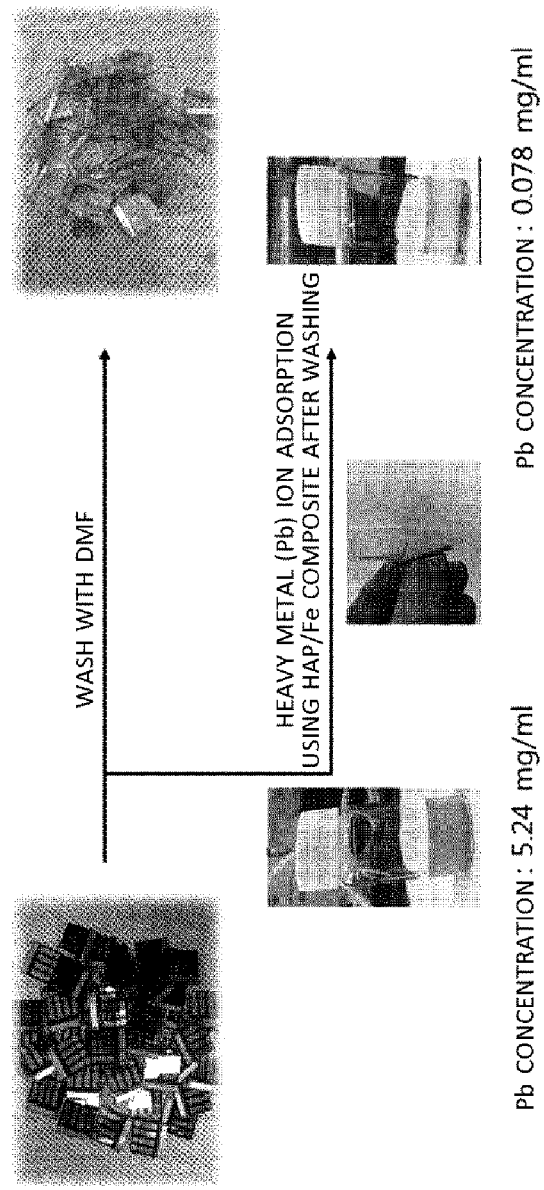
FIG. 12 shows the result of observation of lead ion removal of a composite of HAP and iron from a perovskite waste solution according to an example of the present disclosure.

After 0.05 g of the HAP/Fe composite was put into 10 ml of a 5.24 mg/ml DMF waste solution which washed the perovskite solar cell, heavy metal ions were fully adsorbed and the HAP/Fe composite was separated using a magnet. After the separation, the concentration of lead in the remaining solution was checked through an ICP-MS. As a result thereof, the concentration of remaining lead was 0.078 mg/ml, and, thus, by comparison with the concentration of lead of 5.24 mg/ml before the adsorption, it can be seen that the HAP/Fe particles had excellent heavy metal removal efficiency as shown in FIG. 12.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner. The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A method of synthesizing composites for removing heavy metals, comprising:
    preparing hollow hydroxyapatite particles including a functional group;
    preparing a composite in which magnetic oxide nanoparticles are combined on the hollow hydroxyapatite; and
    preparing a composite of hollow hydroxyapatite and metal particles by performing reduction annealing to the composite.

2. The method of synthesizing composites for removing heavy metals of claim 1,
    wherein the hollow hydroxyapatite particles are formed by ion exchange based on a Kirkendall effect.

3. The method of synthesizing composites for removing heavy metals of claim 1,
    wherein the magnetic oxide nanoparticles are combined with the functional group of the hollow hydroxyapatite by a hydrogen bond.

4. The method of synthesizing composites for removing heavy metals of claim 3,
    wherein the magnetic oxide nanoparticles are combined with the functional group of the hollow hydroxyapatite by an amide bond between a carboxyl group formed on the magnetic nanoparticle and an amine group formed on the hollow hydroxyapatite.

5. The method of synthesizing composites for removing heavy metals of claim 4,
    wherein the amine group is formed by adding the hollow hydroxyapatite particles and (3-aminopropyl) trimethoxysilane into C1 to C4 lower alcohol and making a reaction.

6. The method of synthesizing composites for removing heavy metals of claim 4,
    wherein the carboxyl group is formed by dispersing magnetic nanoparticles in a non-polar solvent, mixing them with a polar aprotic solvent including an organic carboxylic acid and making a reaction.

7. The method of synthesizing composites for removing heavy metals of claim 1,
    wherein the magnetic oxide nanoparticles include an oxide of a metal selected from the group consisting of iron, cobalt, nickel, and combinations thereof.

8. The method of synthesizing composites for removing heavy metals of claim 1,
    wherein the reduction annealing to the composite is performed under an atmosphere of $H_2/N_2$ mixture gas.

* * * * *